United States Patent Office 3,275,605
Patented Sept. 27, 1966

3,275,605
AMINE-MODIFIED UREA-FORMALDEHYDE RESINS AND PROCESS OF MANUFACTURE THEREOF
John W. Eastes, Brevard, N.C., and Robert W. Faessinger, Media, Pa., assignors to Scott Paper Company, Philadelphia, Pa., a corporation of Pennsylvania
No Drawing. Filed Nov. 24, 1964, Ser. No. 413,626
4 Claims. (Cl. 260—70)

The present invention relates to cationic, amine-modified, urea-formaldehyde resins of special value as paper additives and more particularly to improved processes for preparing such resins. This application is a continuation-in-part of Serial No. 722,642, filed March 20, 1958, now abandoned.

The use of synthetic resins in the manufacture of wet-strength papers has been the subject of considerable investigation and there have been developed manifold modifications of the original amino-aldehyde condensation products. Of major importance are the cationic urea-formaldehyde resins containing as a modifier a polyalkylene polyamine of the formula

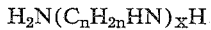
$$H_2N(C_nH_{2n}HN)_xH$$

in which X is one or more and $n$ is 2 or 3, as for example ethylenediamine or diethylenetriamine. Additionally, condensation products of these polyalkylene polyamines with halohydrins, such as alpha dichlorohydrin or epichlorohydrin, with alkylol amines, such as monoethanolamine or triethanolamine, or with formaldehyde or other aldehyde to a water-soluble, low stage reaction may also be employed as an added component in the basic urea-formaldehyde reaction mixture.

These complex amine-modified, urea-formaldehyde resins are characterized generally by more favorable solubility properties in beater application under slightly acid conditions than the conventional urea-formaldehyde resins. Furthermore, there is an increased substantivity of these modified resins toward fibers of cellulosic material, such as paper pulp in aqueous suspension, or, in other words, the resin is selectively adsorbed by the cellulose fibers to enhance the efficiency of the operation. This increased adsorption of the modified resin by the paper pulp is thought to result from the cationic charge on the resin occasioning an attractive force directed toward the negatively charged cellulose fibers. Resins of these general types are described in detail in U.S. Patents Nos. 2,554,475 and 2,683,134 dated May 22, 1951 and July 6, 1954, respectively.

It has also been discovered that the aforementioned types of amine-modified, urea-formaldehyde resins contain at least two different components, both in appreciable quantities, and one of which is more substantive to fibers of cellulosic material in aqueous suspension than the other. Separation of these components is possible by diverse fractional precipitation methods and there is enabled a benefaction of the substantive resin values from a given quantity of raw-resin forming materials involving only a reprocessing of the less substantive component.

It is a principal object of this invention to provide a method of producing directly an amine-modified urea-formaldehyde resin of increased effectiveness in imparting wet strength to fibers of cellulosic material.

A further object of our invention is the production of improved cationic, urea-formaldehyde-polyfunctional amine resins which are free of objectionable impurities normally encountered in such resins and which are characterized by increased effectiveness when employed to augment the wet strength of paper.

Other objects and advantages of the present invention will be readily apparent from the following detailed description of certain preferred embodiments thereof.

The customary condensation reaction of urea-formaldehyde-polyamine results in gelation at a time when the reaction mixture contains approximately equal parts of the greater and lesser substantive resin components. Known methods of securing additional condensation within the reaction mixture do not produce higher yields of wet-strength resins and in fact there results instead composite products of inferior quality for wet-strength applications. Continued research involving modification of reaction mixture composition, operating conditions of temperature, time and pH control have had insignificant effect on the point of maximum conversion to effective resin.

Briefly stated, this invention contemplates a variation in the amine-modified, urea-formaldehyde condensation reaction by means of which there is introduced into the reaction mixture a viscosity lowering-reacting additive to permit continuation of condensation and production of resins of altered physical and chemical properties, achievements ordinarily prohibited by gelation of the usual reaction mixtures.

The present invention is based upon the discovery that the inclusion of a hydroxylated aliphatic compound, a water-soluble, non-ionic compound, such as formaldehyde, paraldehyde, methyl alcohol, ethyl alcohol, normal propyl alcohol, isopropyl alcohol, tertiary butyl alcohol, aliphatic polyols, including ethylene glycol, glycerine, diethylene glycol, triethylene glycol, glucose, and other non-ionic compounds, as for example, furfuryl alcohol, dimethyl sulfoxide and dimethyl formamide, in the urea-formaldehyde-polyfunctional amine reaction mixture inhibits gelation thereof or lowers the viscosity of partially gelled reaction mixtures sufficiently that the condensation reaction and conversion to effective resin may be extended. Depending somewhat upon the amount of additive employed and its application in increments, there may be realized a repetitive cycle of incipient gellation, reduction in viscosity, incipient gellation, to extend the condensation reaction to the point that the ultimate composite product is superior in wet strength generation in paper to known types of composite resins. The extent to which the extended condensation reaction is practical must be determined by a measure of increased time and chemical consumption as compared to increased efficiency of ultimate composite resin product. As a measure of the increases in effective resin attainable through this extended condensation reaction, we have realized a composite resin which is about 50 percent more effective in wet strength tensiles in paper than the known composite resins resulting from the condensation of urea-formaldehyde-polyfunctional amine mixtures.

While we are not certain of the specific constitution and configuration of the effective resin components produced through the present methods, the ultimate resin syrups can be used in the same manner in wet strength application to cellulosic papers as the comparable resins obtained by previously known methods. The use of the hydroxylated aliphatic compound additives is believed to function through the formation of adducts possessing more favorable viscosity characteristics and at the same time regulatory of the degree and direction of extended condensation enabled thereby.

The following examples are illustrative of certain preferred embodiments of our inventive concept:

Example 1

A cationic, urea-formaldehyde-polyfunctional amine resin solution was prepared as follows:

15 parts of ammonium sulfate, 450 parts of urea, 62.5 parts of triethylene tetramine and 1312.5 parts of 37% formaldehyde, U.S.P. were placed in a glass reaction flask of adequate size, fitted with a reflux condenser, mechanical stirrer and thermometer and heated to 80° C. with stirring for 10-15 minutes. At the completion of this initial heating period, the pH of the reaction mixture was adjusted to 3.8-4.0 with 35 parts of diglycolic acid (or 30 parts of maleic anhydride) and heating was continued at 80-82° C. After ½ hour of heating the acidified reaction mixture at 80-82° C., the appearance of the resin syrup changed from a viscous solution to a gel-like mass which pulled away from the sides of the reaction vessel and began to climb up the stirrer shaft. At this point, 54 parts of 37% formaldehyde U.S.P. solution was added rapidly to reduce the gel-like mass to a viscous solution once again. Heating of the thinned solution was continued at 75-80° C. for about ½ hour after which time the resin solution again thickened and began to climb the stirrer shaft. A further 54 parts of 37% formaldehyde U.S.P. solution was added to thin out the gel-like mass and heating of this mixture was continued at 70-75° C. for about ½ hour for a third and final "roping" of the resin about the stirrer shaft. At this final roping stage, 54 parts of 37% formaldehyde U.S.P. solution was added as a final addition and the mixture stirred for about 15 minutes to insure an even distribution of the last formaldehyde charge throughout the resin mass. The resin syrup was then neutralized to pH of 7.1 to 7.3 with 203.5 parts of 10% sodium hydroxide solution and was diluted with 715 parts of water to yield 2953 parts of a resin solution which contained 31% resin solids.

*Example 2*

A cationic, urea-formaldehyde-polyfunctional amine resin was prepared from 15 parts of ammonium sulfate, 450 parts of urea, 62.5 parts of triethylene tetramine and 1367.5 parts of 37% U.S.P. formaldehyde placed in a reaction flask of adequate size fitted with a reflux condenser, thermometer and mechanical stirrer and heated rapidly to 80° C. with stirring. When this temperature was reached, the pH was adjusted to 3.8-4.0 with 35 parts of diglycolic acid and the temperature was maintained at 80-85° C. After about 1½ hours of heating at 79—83° C. the resin syrup changed from a thick solution to a gel-like mass which pulled away from the side of the reaction vessel and was observed to climb up the stirrer shaft. At this point, 54 parts of 37% U.S.P. formaldehyde was added immediately and heating continued at 78-80% C. for about 1½ hours until the resin solution re-exhibited a tendency to climb the stirrer shaft. Again, 54 parts of 37% U.S.P. formaldehyde was added rapidly and stirring was continued for about 10 minutes to insure a thorough distribution of the formaldehyde in the resin mass. The resulting highly viscous solution was then neutralized to a pH of 7.1 to 7.3 with 203.5 parts of 10% sodium hydroxide solution and diluted with 715 parts of water to yield 2953 parts of resin solution which contained 31% resin solids.

*Example 3*

A modified form of cationic, urea-formaldehyde-polyfunctional amine resin solution was prepared from 15 parts of ammonium sulfate, 450 parts of urea, 62.5 parts of triethylene tetramine and 1422.5 parts of 37% U.S.P. formaldehyde in a reaction flask of adequate size fitted with a reflux condenser, thermometer and mechanical stirrer and heated, within about 10 minutes, to 80° C. with stirring. When this temperature was reached, the pH was adjusted to 3.8-4.0 with 35 parts of diglycolic acid and the temperature was maintained at 78-80° C. After 4-5 hours the resin syrup changed from a thick solution to a gel-like mass which pulled away from the sides of the reaction vessel and was observed to climb the stirrer shaft. At this point, 54 parts of 37% U.S.P. formaldehyde was added and stirring was continued for about 10 minutes to insure complete mixing of the formaldehyde in the resin syrup. The resulting solution was neutralized to a pH of 7.1-7.3 with 203.5 parts of 10% sodium hydroxide solution and diluted with 715 parts of water to yield 2953 parts of resin solution containing 31% resin solids.

*Example 4*

A further variation in our process involves the combination of 15 parts of ammonium sulfate, 450 parts urea, 62.5 parts of triethylene tetramine and 1477.5 parts of 37% U.S.P. formaldehyde in a reaction flask of adequate size fitted with a reflux condenser, thermometer, and mechanical stirrer and heating thereof, within 10 minutes, to 80° C. with stirring. At this point the pH was adjusted to 3.8-4.0 with 35 parts of diglycolic acid and the temperature of the reaction mixture was maintained at 78-85° C. until the viscosity of the resin solution rose to 160-180 centistokes measured on a pipette viscosimeter at 80° C. This required about 6 hours. Viscosity measurements at lower temperatures were impossible since the resin syrup becomes a solid upon cooling. At this point, the resin syrup was neutralized with 203.5 parts of 10% sodium hydroxide solution and diluted with 715 parts of water to yield 2953 parts of resin solution containing 31% resin solids.

*Example 5*

A cationic, urea-formaldehyde-tetraethylene pentamine resin was formed from 15 parts of ammonium sulfate, 450 parts of urea, 62.5 parts of tetraethylene pentamine and 1312.5 parts of 37% formaldehyde U.S.P. solution heated in a reaction flask of adequate size fitted with a thermometer, reflux condenser and mechanical stirrer, to 80° C. with stirring. At the completion of this initial heating period, the pH of the reaction mixture was adjusted to 3.8-4.0 with 35 parts of diglycolic acid and heating was continued at 80-82° C. After about ½ hour of heating the acidified reaction mixture at 80-82°, C. the appearance of the resin syrup changed as described in Example 1 above. At this point, 54 parts of 37% formaldehyde U.S.P. solution was added all at once, and heating of the reaction mixture was continued at 75-80° C. After a period of about ½ hour of heating, the resin solution again began to climb the stirrer shaft, and again, 54 parts of 37% formaldehyde U.S.P. solution was added to thin out the gel-like mass. Heating of this mixture was continued at 70-75° C. for about ½ hour for a third and final "roping" of the resin about the stirrer shaft. At this final roping stage, 54 parts of 37% formaldehyde U.S.P. solution was added as a final addition and the mixture stirred for an adidtional 15 minutes. The resulting resin syrup was neutralized to a pH of 7.1 to 7.3 with 203.5 parts of 10% sodium hydroxide solution and diluted with 715 parts of water to yield 2952 parts of resin solution which contained 31% resin solids.

*Example 6*

In another embodiment of our invention, three parts of ammonium sulfate, 90 parts of urea, 12.5 parts of triethylene tetramine and 262.5 parts of 37% formaldehyde U.S.P. solution were placed in a reaction flask of adequate size fitted with reflux condenser, mechanical stirrer, and thermometer and heated to 80° C. At this temperature the pH of the mix was adjusted to 3.8-4.0 with 7 parts of diglycolic acid and heating was continued at 80-85° C. After about 1 hour of heating of this acidified mixture, its appearance changed from a viscous solution to a gel-like mass which pulled away from the sides of the reaction vessel and began to climb up the stirrer shaft during agitation. At this point, 9.6 parts of 95% ethyl alcohol was added, as a unit, and the heating was continued for about ½ hour at 78-80° C. until the gel-like mass formed again. Again a single charge of 9.6 parts of ethyl alcohol were added and heating continued for about 1 hour at 76-78° C. until the gel-like mass formed for the third time. At this point, a final charge of 9.6 parts of ethyl alcohol 95% were added and mixing was continued for about 5-10 minutes. The resulting viscous solution then was neutralized to pH 7.1–7.3 with 38.5 parts of 10% sodium hydroxide solution and diluted with 200 parts of water to yield 642 parts of resin which contained 28% resin solids.

Example 7

A further type of cationic urea-formaldehyde resin was formed from three parts of ammonium sulfate, 90 parts of urea, 12.5 parts of triethylene tetramine and 262.5 parts of 37% formaldehyde U.S.P. solution placed in a reaction flask of adequate size fitted with a reflux condenser, thermometer and mechanical stirrer and heated to 80° C. At this temperature, the pH of the reaction mixture was adjusted to 3.8–4.0 with 7 parts of diglycolic acid and the heating was continued at 80–85° C. After about ½ hour of heating of this acidified mixture, the resin syrup changed with a gel-like mass and was quickly thinned out by the addition of 6.4 parts of 99% methanol. Heating of the resin solution at 78–80° C. was continued until the resin solution again thickened sufficiently to rope about the stirrer shaft. Once more 6.4 parts of methanol were added and heating at 73–80° C. was continued until the resin solution roped for third and last time. At this point, 6.4 parts of methanol were added once more and stirring continued to insure a thorough distribution of the alcohol throughout the mass; then the resin syrup was neutralized with 38 parts of 10% sodium hydroxide solution and diluted with 200 parts of water to yield 639 parts of resin solution which contained 28% resin solids.

The effect upon wet strength paper of the modified form of resins produced by our process is demonstrated by tensile value measurements of handsheets formed on a Noble and Wood machine without a white water system, in the following manner: 60 grams (dry basis) of West Coast bleached sulphite pulp having a consistency of 3.2% and a Canadian freeness of from 450–500 were subjected to the action of a British disintegrator. At 900 counts (100 counts is equivalent to about 1 minute), sufficient 10% hydrochloric acid solution was added to adjust the pH of the suspension to about 4.0. At 1000 counts, 5% aqueous resin solution was added in such quantities as to constitute 0.6% resin based upon the dry weight of the pulp employed. At 1500 counts, disintegration was stopped and the treated pulp poured into the Noble and Wood proportionating box, and the necessary adjustments were made to yield 20 lb. ream weight handsheets (ream weight equals pounds per 2880 square feet). The pH was again adjusted to 4.0 with 10% hydrochloric acid solution and a metered quantity of pulp suspension was then diluted with water in the deckle box of the machine to yield one 8″ x 8″ sheet which was formed, pressed and dried. Test tensile strips were cut from the sheet, cured at 300° F. for 2 minutes, then aged for about one hour at 75° F. and 55 to 60% relative humidity. The wet tensile strength of strips soaked in water for one minute and the dry tensile strength of each strip was measured on a Thwing-Albert tensile tester and the mean values in ounces are set forth in the following table:

| Resin | Percent Resin Applied on Dry Basis of Pulp | Oz. Cured Tensile | |
|---|---|---|---|
| | | Wet | Dry |
| None | 0.0 | 2.8 | 90.0 |
| A Standard Prior Art Resin* | 0.6 | 24.3 | 102.0 |
| Example 1 | 0.6 | 33.0 | 113.0 |
| Example 2 | 0.6 | 33.6 | 127.6 |
| Example 3 | 0.6 | 33.7 | 115.2 |
| Example 4 | 0.6 | 33.2 | 129.6 |
| Example 5 | 0.6 | 34.1 | 125.3 |
| Example 6 | 0.6 | 32.3 | 129.6 |
| Example 7 | 0.6 | 32.4 | 121.6 |

*U.S. Patents 2,554,475 and 2,633,134.

While in the described examples only a few of the polyfunctional amines and a few of the acids employed to effect and maintain acid conditions in the acid polymerization stage have been exemplified, the uses of various polyfunctional amines and various acids are described in the prior art and are well known to the trade. We have employed a variety of these polyfunctional amines and these acids of the prior art to secure a large number of cationic, urea-formaldehyde, polyfunctional, amine-modified resins and through addition of the described additives at or prior to the gel stage of polymerization, where viscosity increases rapidly without material increase in wet strength resin value of the composite resin, have obtained uniform increases in efficiencies of about 1½ times that of composite resins of prior art processes. In addition to the enumerated amines, it is possible to utilize ethylenediamine, diethylenetriamine, monoethanolamine, diethanolamine, and triethanolamine, as well as various mixtures thereof. Similarly, in place of the specified diglycolic and maleic acids for maintaining an acid condition in the polymerization stage, it is possible to substitute with equal effect oxalic acid, O-phthalic acid, acetic acid, phosphoric acid, hydrochloric acid, and sulfuric acid.

The compounds, heretofore designated as viscosity-lowering additives, have the common property of water solubility and are non-ionic in character. Of the many compounds listed as operable in our process, those aliphatic alcohols containing from 1–4 carbon atoms are preferred. It should be pointed out in listing these additives that formaldehyde is regarded as a hydroxy aliphatic compound since it exists in the reaction mixture in its hydrated form or as methylene glycol. Furthermore, mixtures of additives, and in particular a combination of formaldehyde and methyl or ethyl alcohol, are particularly effective in achieving the desired results.

As to the amounts of additive compounds above referred to and employed, considerable latitude is permissible. Some variation is possible depending upon the individual resin involved and the additive compound chosen; as a general guide, we employ sufficient in each cycle to extend the wet-strength value about 10% before a subsequent gelling occurs. The specific amounts employed in accordance with the objectives to be accomplished can be determined by trial, but generally speaking, about 5% on the basis of the total resin solids present is employed in each successive stage.

As is to be seen from the examples and description above, the essential variant, applicable on known prior art methods, is the employment of the water-soluble, non-ionic compound as an addition in connection with known processes for the synthesis of the cationic, urea-formaldehyde, polyfunctional, amine-modified resin at the gelling stage in the polymerization step (acid side). While in the examples the additives, that is, the water-soluble, non-ionic compounds, are added in separate steps, alternately reducing the viscosity and continuing the polymerization to the gel stage, the additions can take place in such a way that they are made practically continuous under a timing schedule so that the reaction mass is maintained as a stirrable mass slightly below the gelling or roping stage.

When mixtures of methyl alcohol and formaldehyde are used, the quality of product and control of speed of the polymerization reaction are influenced by varying percentages. For example, when using a mixture and the ratio of formaldehyde to methyl alcohol falls below 37:6–8 these are adversely affected. However, larger percentages of methanol slow the reaction practically to a stop.

In the specification and claims there are employed the terms polyalkylene, polyamine-modifier resins, alkylene polyamine-modified resins and polyfunctional, amine-modified resins. In the use of these terms "polyamine" types are narrower in that the connecting or bridging bonds are through basic nitrogens only. In the use of the term polyfunctional amine, the compounds comprehended are broader in that the connecting or bridging bonds may be through basic nitrogen bonds only or through basic nitrogen bonds and others.

For purposes of this invention, by "gelling point" of the reaction mixture, it is intended to mean the incipient solidification of a resin as characterized by the rapidly increasing viscosity of the reaction mass. Visually this point is observed when the reaction mass starts to climb up or "rope" on a stirrer shaft when the reaction is conducted as in Example 5.

What we claim is:

1. In the process of making cationic, polyfunctional amine-modified, urea-formaldehyde resins by the acid condensation in an aqueous medium of a reaction mixture of urea, formaldehyde and a polyfunctional aliphatic amine having at least two amino groups, which reaction mixture is susceptible of condensation to the gelling point, the improvement which comprises introducing into the reaction mixture, immediately prior to the point of solidification thereof, a viscosity lowering reacting additive selected from the group consisting of formaldehyde, paraldehyde, methyl alcohol, ethyl alcohol, normal propyl alcohol, isopropyl alcohol, tertiary butyl alcohol, ethylene glycol, diethylene glycol, triethylene glycol, glycerine, furfuryl alcohol, dimethyl sulfoxide and dimethyl formamide in an amount approximating 5% by weight of the total solids content of said reaction mixture, and thereafter resuming the condensation reaction again to proceed to the point of gelling of the reaction mass.

2. In the process of making cationic, polyfunctional amine-modified, urea-formaldehyde resins by the acid condensation in an aqueous medium of a reaction mixture of urea, formaldehyde and a polyfunctional aliphatic amine having at least two amino groups, which reaction mixture is susceptible of condensation to the gelling point, the improvement which comprises introducing into the reaction mixture immediately prior to the point of solidification thereof a combination of formaldehyde and methyl alcohol in an amount approximating 5% by weight of the total solids content of said reaction mixture and thereafter resuming the condensation reaction again to proceed to the point of gelling.

3. In the process of making cationic, polyfunctional amine-modified, urea-formaldehyde resins by the acid condensation in an aqueous medium of a reaction mixture of urea, formaldehyde and a polyfunctional aliphatic amine having at least two amino groups, which reaction mixture is susceptible of condensation to the gelling point, the improvement which comprises introducing into the reaction mixture immediately prior to the point of solidification thereof a viscosity lowering additive selected from the group consisting of formaldehyde, paraldehyde, methyl alcohol, ethyl alcohol, normal propyl alcohol, isopropyl alcohol, tertiary butyl alcohol, ethylene glycol, diethylene glycol, triethylene glycol, glycerine, furfuryl alcohol, dimethyl sulfoxide and dimethyl formamide in an amount approximating 5% by weight of the total solids content of said reaction mixture, said amount being sufficient to permit the condensation reaction to be continued without gelation of the reaction mixture, and thereafter sequentially raising and lowering the viscosity of the reaction mixture by further condensation thereof and additive introductions therein.

4. A thermosetting cationic amine-modified, urea-formaldehyde resin capable of imparting wet strength to sheeted cellulosic fibers, produced by the method of claim 1.

References Cited by the Examiner

UNITED STATES PATENTS

| | | | |
|---|---|---|---|
| 2,145,242 | 1/1939 | Arnold | 260—70 |
| 2,300,208 | 10/1942 | D'Alelio | 260—69 |
| 2,546,575 | 3/1951 | Wooding | 260—70 |
| 2,683,134 | 7/1954 | Davidson et al. | 260—70 |
| 2,827,441 | 3/1958 | Romatoweki | 260—71 |
| 2,881,154 | 4/1959 | Polansky | 260—70 |
| 3,132,119 | 5/1964 | Abler | 260—70 |

FOREIGN PATENTS 245,745   5/1960   Australia.

SAMUEL H. BLECH, *Primary Examiner.*

W. H. SHORT, *Examiner.*

H. E. SCHAIN, *Assistant Examiner.*